United States Patent
Miller et al.

[15] 3,705,617
[45] Dec. 12, 1972

[54] SUBLIMATION APPARATUS AND METHOD

[72] Inventors: George M. Miller, Winchester; Max E. Underwood, Bedford, both of Mass.

[73] Assignee: The Badger Company, Inc., Cambridge, Mass.

[22] Filed: Nov. 5, 1970

[21] Appl. No.: 87,162

[52] U.S. Cl. ............................165/1, 165/179, 260/346.7
[51] Int. Cl. ..................................................F28
[58] Field of Search .............165/179, 1, 2, 10.9 T; 260/346.7

[56] References Cited

UNITED STATES PATENTS

| | | |
|---|---|---|
| 1,957,006 | 5/1934 | Wescott.....................165/1 |
| 2,188,133 | 1/1940 | Hepburn...................165/179 |
| 2,467,668 | 4/1949 | Hallberg...................165/179 |
| 2,668,424 | 2/1954 | Muller......................165/111 |
| 2,895,508 | 7/1959 | Drake........................165/57 |
| 2,702,091 | 2/1955 | Smith..........................62/57 |
| 3,024,009 | 3/1962 | Booth.......................165/111 |
| 3,443,630 | 5/1969 | Auld........................165/111 |
| 2,076,033 | 4/1937 | Kniskern..................26/346.7 |
| 2,583,013 | 1/1952 | Patterson................260/346.7 |
| 2,692,657 | 10/1954 | Barton....................260/346.7 |

Primary Examiner—William J. Wye
Attorney—Sewall P. Bronstein and Donald Brown

[57] ABSTRACT

Method and apparatus for recovering a product (e.g. phthalic anhydride) from a hot effluent product gas in which it exists as a vapor by passing the product gas through a cooled internally finned tube at a temperature to condense or sublimate (solidify) the product out of said product gas as a solid on the fins and internal walls of said tube without encountering rapid plugging of the tube.

8 Claims, 6 Drawing Figures

INVENTORS
GEORGE M. MILLER
MAX E. UNDERWOOD
BY
Cushman, Darby & Cushman
ATTORNEYS

SUBLIMATION APPARATUS AND METHOD

SUMMARY OF THE INVENTION

The present invention is directed to an apparatus and method for recovering from hot effluent gases a product, particularly phthalic anhydride (PAA), which is normally solid but which is present in the effluent gas as a vapor, by condensing the gaseous product out of the effluent gas as a solid. This is sometimes referred to as sublimation or solid condensation.

PAA is usually prepared by the vapor phase fixed or fluid bed catalytic oxidation of naphthalene or o-xylene with oxygen-containing gases e.g. air).

PAA is generally recovered from the hot reaction product or effluent gases by first passing the hot effluent gases from the catalytic reactor through liquid condenser at a temperature below the boiling point of the PAA but above the melting point to remove part of the PAA by condensing it out as a liquid, and thereafter passing the still hot (above the melting point of the PAA) effluent gases, containing the remaining PAA, through a solid condenser at a temperature below the melting point of the PAA to remove the rest of the PAA from the effluent gases by condensing or sublimating it out as a solid on the condenser surfaces. The solid PAA deposited in the solid condenser is subsequently melted out and combined with the liquid PAA previously recovered.

In the aforesaid condensation of PAA from the effluent gases as a solid, an inherent peculiarity of PAA is to rapidly solidify or sublime upon the nucleus of an initial crystal formation. This phenomenon of rapid propagation of PAA sublimates in conjunction with solid phthalic acid formation associated with sublimation (the phthalic acid is formed by reaction of the PAA with water vapor in the effluent gas) creates difficulties because of rapid pressure drop buildup in the condenser due to restriction of flow of the effluent gas.

For this reason, conventional PAA solid condensers include bundles of externally finned tubes mounted within a shell with PAA solidification occuring in the shell on the external tube walls and internal shell walls, although it has been suggested in U.S. Pat. No. 2,762,449 to solidify the PAA within tubes having circumferentially extending external fins, which is inefficient because of the limited surface presented by the smooth internal walls of the tubes.

However, solidification on the external finned tube walls has certain disadvantages. For example, it has the disadvantages of requiring a relatively complex physical construction such as bayonet tube or floating head design and complicated baffle arrangements to prevent poor flow pattern by by-passing. These complexities present a maintenance problem. Furthermore, the flow path of the coolant through the interior of the tubes normally provides inefficient heat removal.

The present invention is based on the discovery that by passing the hot effluent gases, containing the vaporous PAA or other product to be removed therefrom by sublimation or solid condensation, through internally finned tubes, highly efficient solid condensation or sublimation of the product occurs on the cooled internal fins and internal walls of the tube without the aforesaid disadvantages and also without the rapid buildup of pressure drop, as would be expected.

With this arrangement, the required large condensing surface areas for efficient sublimation are achieved without the rapid buildup of pressure drop so that the on-stream time, during which sublimation is carried out in the tubes before the flow of effluent gas is shut off for melting, compares favorably with the on-stream times using the aforesaid conventional techniques.

In addition, with the internally finned tube construction of this invention, no exceptionally rapid buildup of solid PAA deposit occurs at the entry portion of the tube, as would be expected, but rather sublimation of the PAA occurs substantially uniformly over the entire tube length.

Furthermore, these internally finned tubes make possible the simplest and least expensive heat exchanger design, e.g., fixed tube sheets at both ends with straight and direct flow paths of the PAA gas without by-passing, compared to the aforesaid complex structures and flow paths utilized with external sublimation. Furthermore, this type of fixed tube sheet design with coolant flowing on the shell side lends itself to highly efficient baffling for optimum velocities and heat transfer.

Although internally finned tubes are old, to our knowledge such tubes have never been used for sublimation purposes. The reason for this may have been that those skilled in the art thought rapid plug up of such tubes would occur with rapid buildup of pressure drop with resultant impractically short on-stream periods and inefficient sublimation.

In a highly preferred embodiment of the invention, the internally finned tube construction is designed to obtain an efficient flow pattern and rate through the tubes while at the same time achieving a high surface area. This is achieved by the provision of a particular geometric relationship of fin spacing and size.

Accordingly, this invention provides a new and improved method for recovering PAA and other products capable of sublimation from effluent gases in which they are present as a vapor, by directing the effluent gases through a cooled internally finned tube or tubes arranged as a condenser to condense such products out of the effluent gases as a solid.

DESCRIPTION OF PREFERRED EMBODIMENTS

Figure 1:
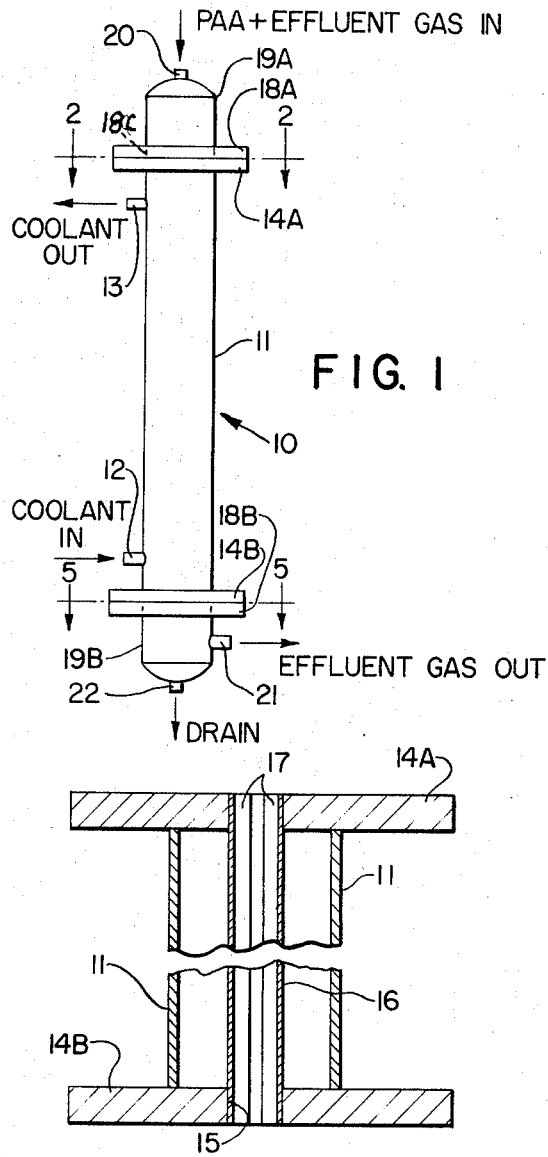
FIG. 1 is a side view of a condenser constructed according to the invention.
Figure 2:
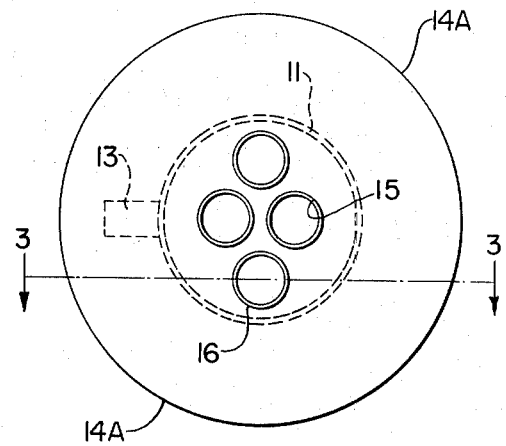
FIG. 2 is a view in plan taken along line 2—2 of FIG. 1 with the tubes being shown without fins for simplicity of illustration.

FIGS. 1–5 show a preferred construction of a condenser according to the invention. The condenser apparatus is shown generally at 10 and comprises an outer metal casing or shell 11, preferably tubular and preferably insulated, and having ports 12 and 13 permitting coolant (e.g. tempered water) to flow into the interior of the shell, by way of port 12 and thence out of port 13. At either end of the shell 11 there are provided metal tube sheets or plates 14A–14B. These sheets or plates are jointed to the shell 11 at either end by welding or other method known in the art. The plates 14 A and 14B are provided with a plurality of holes 15 extending therethrough which are adapted to receive the ends of a plurality of internally finned metal tubes 16 in an leak-tight manner. For simplicity of illustration, the internal fins 17 in each of the tubes, which fins extend radially inwardly and longitudinally of the tube, are only shown in FIGS. 3 and 4, but it should be understood that the tubes shown in FIG. 2 have these internal fins, although they have not been illustrated for reasons of simplicity.

Positioned above tube plate 14A and below tube plate 14B are hollow end housings 19A and 19B, which are of the same construction except for the number of ports provided therein and which are secured to the plates 14A and 14B in a leak-tight manner by bolted flanges 18A and 18B. The housing 19A includes a port 20 in its domed end wall, which is coupled through a valved conduit to the outlet of a conventional PAA liquid condenser (not shown) or directly to the outlet of the reactor (not shown) and which is adapted to inlet hot effluent gages containing PAA in the form of vapor. The housing 19B includes a port 21, from which the remaining effluent gases exit after the PAA is removed therefrom by condensation as a solid in the tubes 16, and a PAA drain port 22. The drain port 22 is coupled to a pipe and valve arrangement, which is normally closed during on-stream condensation, but which upon termination of the on-stream condensation period, is opened to drain off the melted PAA deposited on the internal walls and fins of the tubes when the tubes are heated in conventional manner, usually by steam, to melt the solid PAA sublimate formed on the interior of the tubes and the fins. During this melting operation the inlet 20 and exit 21 are closed to flow of effluent gases therethrough and the inlet 12 and outlet 13 are closed to flow of coolant therethrough in a conventional manner. Conventionally, during melting in one or more solid condensers, the hot effluent gas and coolant are routed to one or more other solid condensers.

Preferably, the solid PAA is melted by passing steam under pressure and at a temperature above the melting point of PAA through the ports 12 and 13 and through the shell around the tubes.

Figures 3, 5:
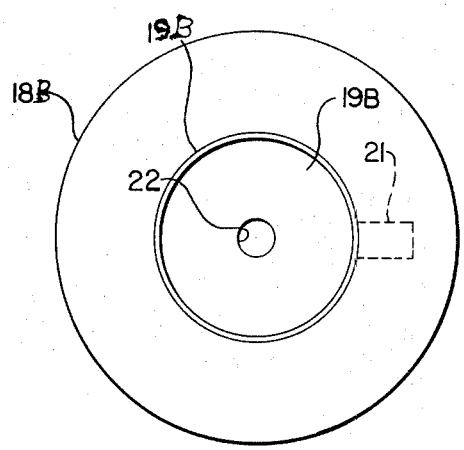
FIG. 3 is a sectional view in elevation taken along line 3—3 of FIG. 2 with the tube shown with only two oppositely disposed internal fins for simplicity of illustration.
FIG. 5 is a sectional view taken along line 5—5 of FIG. 1.
Figures 4, 6:
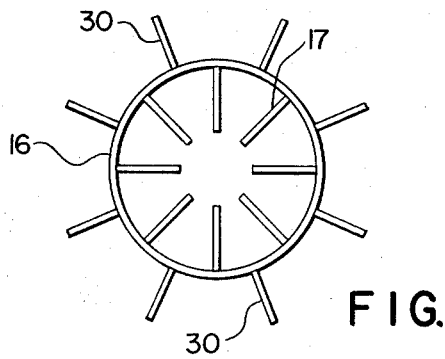
FIG. 4 is a top plan view of an internally finned tube according to this invention.
FIG. 6 is a top plan view of another embodiment of the internally finned tubes of the invention which include a number of external fins.

In FIGS. 3 and 4, there is more particularly shown the construction of the tubes 16 and the radial and longitudinal fins 17. It has been found, in practice, that if the ratio of the fin spacing "L," which is the distance between the radially and longitudinally extending mid or center plane X of each fin and a plane Y parallel thereto and passing through the line Z formed by the intersection of the radially and longitudinally-extending mid or center plane of the next adjacent fin with the inner surface of the tube 16, as shown in FIG. 4, to the center hole diameter "D" (as shown), is made equal to .75 to 1.25 or 1.5, and more preferably to 1 ± 10%, optimum flow pattern will be obtained with optimum surface area to condense the PAA sublimate. With this arrangement, it has been found, surprisingly, that the tubes will not plug at a rapid rate by collection of the solid PAA on the fins and internal tube walls so that the condenser can be left on-stream for a satisfactory length of time before the melting operation for good efficiency and that the solid PAA does not build up rapidly at the inlet portions of the cooled tubes as compared to the rest of the tube lengths. It is preferable for fabrication as well as to provide optimum surface area that the fins extend radially inwardly from the inside of the tube at least ¼ of the internal diameter of the tube and preferably no more than about ⅓ of the internal diameter of the tube.

It is also preferable for the center hole diameter D to be between about ½ to ⅓ of the inside tube diameter to achieve a good flow pattern for the effluent gases passing through the tube. Tests have also shown that the internal fins need not extend the entire length of the tube, as shown, to effectively condense the PAA therein. In addition, the number of tubes 16 used, as well as the number of fins, can vary more or less as long as there is a sufficient number of tubes and fins therein to provide adequate surface to remove the PAA at reasonable flow rates.

EXAMPLE

In practicing this invention, four vertical aluminum tubes 20 feet long with an I.D. of 1.58 inches and a wall thickness of 0.83 inches and having eight internal fins .065 inches thick spaced about the inside of the tube an equal distance from each other with a center hole diameter of ⅝ inches and an L/D ratio of 1.0 were utilized in the configuration shown in FIGS. 1–5. A hot PAA-containing reaction product effluent gas, made by the vapor phase, fluid bed, catalytic air oxidation of naphthalene, which had been passed through a liquid condenser at a temperature below the boiling point of the PAA but above the melting point thereof to condense out part of the PAA as a liquid, was fed to inlet 20 from the outlet of the liquid condenser at an inlet (inlet 20) temperature of 270° F through tubes 16 of FIG. 1 for about 1 hour periods while coolant, tempered water, was flowed through the shell 11 and around tubes 16 via ports 12 and 12 at a temperature and rate to cool the tubes and fins to a temperature below the melting point of the PAA and thereby cause the PAA to solidify or sublimate out of the effluent gas and on the cooled fins and internal walls of the tubes. The remaining cooled effluent gas flowed out of port 21 at about the same temperature as the coolant flowing into port 12. The pressure drop across inlet 20 and outlet 21 builds up during the hour from essentially zero at the beginning to 1.6 psi with the flow rate at outlet 21 being maintained constant throughout the hour. This pressure drop was nominal and was built up only gradually over the hour. Thereafter, flow of effluent gas through the condenser was shut off and the solidified PAA was melted and drained through the drain port 22 by passing steam under pressure through the shell via ports 12 and 13, after which the condenser was placed on-stream for another hour. Efficiency of recovery of PAA in the melts was excellent. The melts were added to the crude liquid PAA from the liquid condenser.

It should be understood that the above dimensions are given by way of example only and can vary over a broad range, e.g. the tube can be longer or shorter, e.g., from 10 to 15 feet or less to 21 or 25 feet or more, more or less fins can be utilized and the internal tube diameter can be smaller or greater, e.g. from ¾ inch to 2.0 inches and larger.

The flow rates through the condenser may be the same as those used in external sublimation on the shell side.

Also the inlet pressures may vary from 1.0 psig. or less to 13 or 20 psig. or more.

Furthermore, the on-stream condensation time periods can be increased to substantially greater than an hour with highly efficient results. For example, excellent results were achieved with an onstream time of 75 minutes.

It was found that as the flow rate through the tubes was increased and the on-stream condensing time was increased, the amount of PAA collected from the melts increased in direct proportion without any decrease in efficiency.

As the flow rate was increased with the same tube dimensions and the same number of tubes, the pressure drop increased during the same on-stream condensation period and, of course, pressure drop also increased with increase in the on-stream time with the same flow rate.

The condenser may be made of aluminum or aluminum alloys in which the major constituent is aluminum, or of carbon steel or other heat conductive metals.

The invention is applicable to the sublimation of products other than PAA.

Reference should now be had to FIG. 6 which shows another embodiment of the invention. In this embodiment the internally finned tube 16 is provided with external radial and longitudinal fins 30 which aid in cooling the surface area by permitting the more rapid escape of heat into the coolant medium passing about the outside of the tube and within the shell.

A prior art search uncovered U.S. Pat. Nos. 2,762,449; 2,583,013; 3,326,941; 1,519,673; 813,918; 2,930,405; 3,267,563; 3,273,599; 2,405,722; 2,913,009; 2,978,797; 2,550,772; 3,002,729; 2,467,668; 349,060; 1,881,610; 2,291,985, none of which disclose the use of internally finned tubes for sublimation or solid condensation of phthalic anhydride or any other product out of an effluent gas in accordance with the present invention.

The present invention is not intended to be limited to the embodiment shown and described hereinbefore for illustration purposes but only to the methods and constructions encompassed by the appended claims and their equivalents.

We claim:

1. In a process for recovering phthalic anhydride, or other product capable of forming a sublimate, from effluent gases, in which said product exists as a vapor, by condensing said product out of said effluent gases as a solid, the improvement comprising passing said effluent gases through a tube having internal fins and cooled to a temperature below the melting point of said product to solidify the phthalic anhydride or other product on the interior of the tube and the walls of the fins.

2. A process according to claim 1 in which the tube is constructed such that the ratio of the fin space "L" between adjacent fins to the center hole diameter created by the geometry of the fin tips is substantially .75 to 1.5.

3. A process according to claim 1 in which the fins extend inwardly at least about ¼ of the inside diameter of the tube.

4. A process according to claim 1, said fins providing a center hole between fin ends of a diameter between ½ and ⅓ the inside diameter of the tube.

5. An apparatus for recovering a sublimatable product from an effluent gas containing said product in the form of a vapor, comprising at least one tube having internal radial fins, a shell housing at least a portion of said tube, means for supporting the tube within said shell, means for flowing said effluent gas into and through the tube, means for flowing coolant through said shell and around the outside of said tube to cool the surfaces of said tube without entering the tube, said fins providing a center hole between fin ends of a diameter between ½ to ⅓ the inside diameter of the tube.

6. An apparatus according to claim 5 in which the tube is constructed such that the ratio of the fin space "L" between adjacent fins to the center hole diameter created by the geometry of the fin tips is .75 and 1.5.

7. An apparatus according to claim 5 in which the fins extend inwardly at least about ¼ of the diameter of the tube.

8. An apparatus for recovering a product from an effluent gas containing said product in the form of a gas by reducing the temperature to below the melting point of said product to convert the product to a solid form, said apparatus comprising at least one tube having internal radial fins extending longitudinally of the tube, a shell housing at least a portion of said tube, means for flowing said effluent gas into and through the tube, means for flowing coolant through said shell and around the outside of said tube within the shell, the ratio of the fin space "L" between adjacent fins to the center hole diameter created by the geometry of the fin tips being 0.7 to 1.5.

* * * * *